United States Patent
Rodewald et al.

(10) Patent No.: US 12,515,155 B2
(45) Date of Patent: Jan. 6, 2026

(54) COALESCER SUPPORT, FILTER SYSTEM, AND METHOD OF USE

(71) Applicant: Pall Corporation, Port Washington, NY (US)

(72) Inventors: Cord Rodewald, Dreieich (DE); Michael Baldino, Port Washington, NY (US); Jeffrey Bernard Niedzialkowski, Port Washington, NY (US)

(73) Assignee: Pall Corporation

( * ) Notice: Subject to any disclaimer, the term of this patent is extended or adjusted under 35 U.S.C. 154(b) by 470 days.

(21) Appl. No.: 18/130,131

(22) Filed: Apr. 3, 2023

(65) Prior Publication Data

US 2024/0325954 A1    Oct. 3, 2024

(51) Int. Cl.
*B01D 46/00*    (2022.01)
*B01D 17/04*    (2006.01)

(52) U.S. Cl.
CPC ....... *B01D 46/0004* (2013.01); *B01D 17/045* (2013.01); *B01D 46/0005* (2013.01); *B01D 2257/108* (2013.01)

(58) Field of Classification Search
CPC .............. B01D 17/045; B01D 2201/04; B01D 2257/108; B01D 2265/06; B01D 46/0004; B01D 46/0005; B01D 46/003; B01D 46/24
See application file for complete search history.

(56) References Cited

U.S. PATENT DOCUMENTS

| | | | |
|---|---|---|---|
| 4,276,065 | A | 6/1981 | Miko |
| 7,520,392 | B2 | 4/2009 | Schewitz |
| 11,918,948 | B2 | 3/2024 | Parikh et al. |
| 2016/0317960 | A1 | 11/2016 | Chen et al. |
| 2017/0225109 | A1 | 8/2017 | Gerken et al. |
| 2018/0015402 | A1 | 1/2018 | Parsons |

FOREIGN PATENT DOCUMENTS

| | | |
|---|---|---|
| CN | 1568214 A | 1/2005 |
| CN | 107614083 A | 1/2018 |
| CN | 108778462 A | 11/2018 |
| CN | 111140416 A | 5/2020 |
| WO | 2006/096466 A1 | 9/2006 |

OTHER PUBLICATIONS

International Searching Authority, International Search Report issued in International Application No. PCT/US2024/019985, mailed May 15, 2024.
International Searching Authority, Written Opinion of the ISA issued in International Application No. PCT/US2024/019985, mailed May 15, 2024.

(Continued)

*Primary Examiner* — Dirk R Bass
(74) *Attorney, Agent, or Firm* — Leydig, Voit & Mayer, Ltd.

(57) ABSTRACT

A support for a coalescer filter element comprising first and second ends, and a fluid flow bar having at least three fluid channels extending from the first end to the second end; and a filter system including a coalescer filter element arranged on the support, and a method of removing undesirable contaminants and/or fluids from gas using the filter system, are disclosed.

11 Claims, 16 Drawing Sheets

(56) References Cited

OTHER PUBLICATIONS

DuPont, Brink® Mist Eliminators Industrial Solutions For Clean Air, pp. 1-12 (2013).
Taiwan Intellectual Property Office, Office Action issued in counterpart Taiwanese Patent Application No. 113110806, mailed on Feb. 5, 2025.
AquaSep® XS Coalescers Effectively Separate Liquid/Liquid Dispersions, *Pall Corporation*, pp. 1-4 (Feb. 2015).
Medallion™ HP Series Liquid/Gas Coalescers, *Pall Corporation*, pp. 1-2 (Mar. 2011).
PhaseSep® A/S Series Liquid/Liquid Coalescer, *Pall Corporation*, pp. 1-2 (Mar. 2009).
Profile® Coreless Filter Elements, *Pall Corporation*, pp. 1-2 (Aug. 2010).
SepraSolTM Plus Liquid/Gas Coalescers, *Pall Corporation*, pp. 1-4 (Oct. 2010).

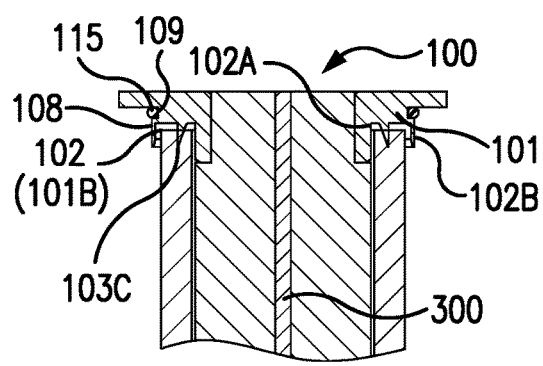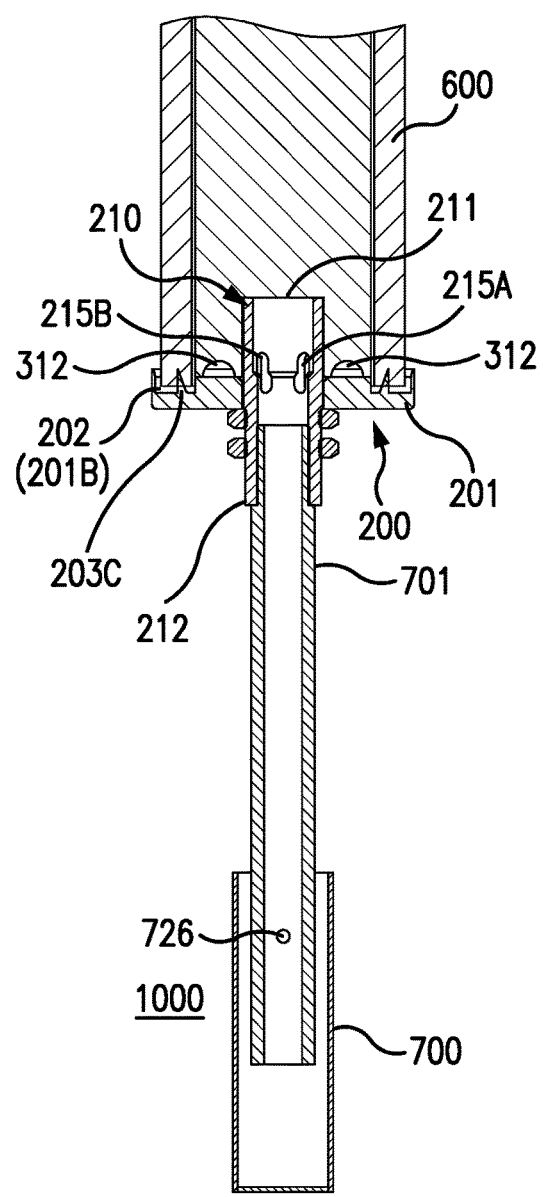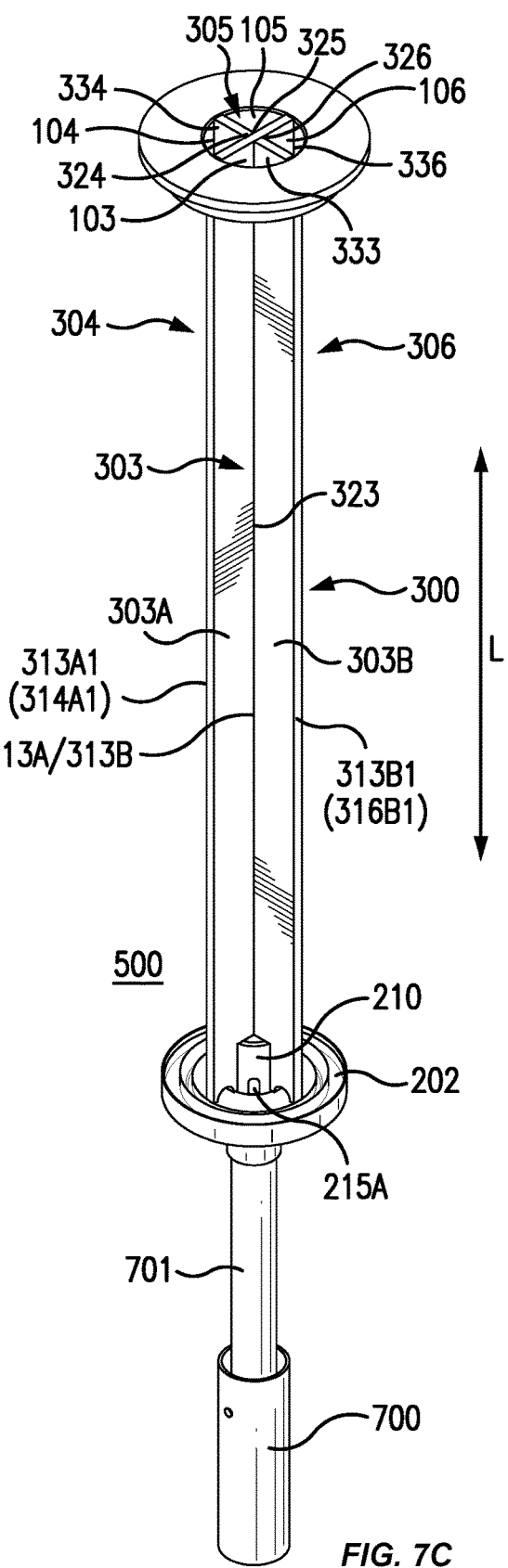
FIG. 7B
FIG. 7C

COALESCER SUPPORT, FILTER SYSTEM, AND METHOD OF USE

BACKGROUND OF THE INVENTION

Some systems for enabling industrial efforts into decarbonization use an anode, cathode, and a liquid electrolyte solution including, water and, for example, potassium hydroxide (KOH) solution or sodium hydroxide (NaOH) solution, to produce hydrogen and oxygen gases, which can later be released (as in the case of oxygen), stored, or liquified and, in the case of hydrogen, used to power devices. These gases often contain undesirable contaminants and/or fluids, such as, e.g., residual KOH or NaOH, that must be removed from the gas before further processes or uses.

There is a need for improved devices and systems for removing undesirable contaminants or fluids and/or recovering desirable components from gas before the gas is further processed and/or used. The present invention provides for ameliorating at least some of the disadvantages of the prior art. These and other advantages of the present invention will be apparent from the description as set forth below.

BRIEF SUMMARY OF THE INVENTION

An aspect of the invention provides a support for a coalescer filter element is provided comprising: (a) a first end including a first end piece, the first end piece having an outer surface and an inner surface, and having a first end annular channel having first and second channel side walls, connected to the inner surface, and having at least three fluid channel openings passing through the outer surface and the inner surface: (b) a second end including a second end piece, the second end piece having an outer surface and an inner surface, and having a second end annular channel having first and second channel side walls, connected to the inner surface, the second end piece including a hollow fitting having an inlet end, an outlet end, and a side wall having at least two openings through the side wall, the outlet end extending outwardly from the outer surface: wherein the first end is connected to the second end by a fluid flow bar having at least three fluid channels extending from the first end to the second end, the fluid flow bar and the at least three fluid channels having a longitudinal axis from the first end to the second end, each of the at least three fluid channels having first and second solid side walls, each of the first and second solid side walls each having an inner side and an outer side, the inner side of the first solid wall connected to the inner side of the second solid wall, and the outer side of the first solid wall spaced away from the outer side of the second solid wall, wherein each of the at least three fluid channels separately communicate with a respective fluid channel opening at the first end; and wherein the hollow fitting and at least two openings are in fluid communication with the at least three fluid channels at the second end.

In another aspect, a filtration system is provided comprising: an aspect of the support for a coalescer filter element; and a hollow cylindrical coalescer filter element arranged on the support, such that the support passes through the hollow cylindrical coalescer filter element, and one end of the hollow cylindrical coalescer filter element is received in the first end annular channel and another end of the hollow cylindrical coalescer filter element is received in the second end annular channel.

In yet another aspect, a coalescer assembly is provided comprising a housing having an outlet and an inlet defining a fluid flow path from the inlet to the outlet and including an aspect of the filtration system across the fluid flow path. In some aspects, the coalescer assembly includes two or more filtration systems in the housing across the fluid flow path.

In another aspect, a method for removing undesirable contaminants and/or fluids from gas is provided, the method comprising passing gas through an aspect of the filtration system, and separating gas from undesirable contaminants and/or fluids. In a preferred aspect, the method comprises separating hydrogen from KOH droplets.

BRIEF DESCRIPTION OF THE SEVERAL VIEWS OF THE DRAWING(S)

FIG. 1A is a drawing showing an exploded view of the support for a coalescer filter element comprising first and second ends with end pieces, a fluid flow bar with fluid channels, and a hollow fitting according to an aspect of the invention, and FIG. 1B is a drawing showing the assembled support as shown in FIG. 1A.

FIG. 2 is a drawing showing an exploded view of a filtration system comprising the support for a coalescer filter element shown in FIG. 1A, and a hollow cylindrical coalescer filter element configured to be arranged on the support. The figure also shows the filtration system further comprising a fluid receiving container in fluid communication with the hollow fitting of the support for a coalescer filter element.

Figure 2:
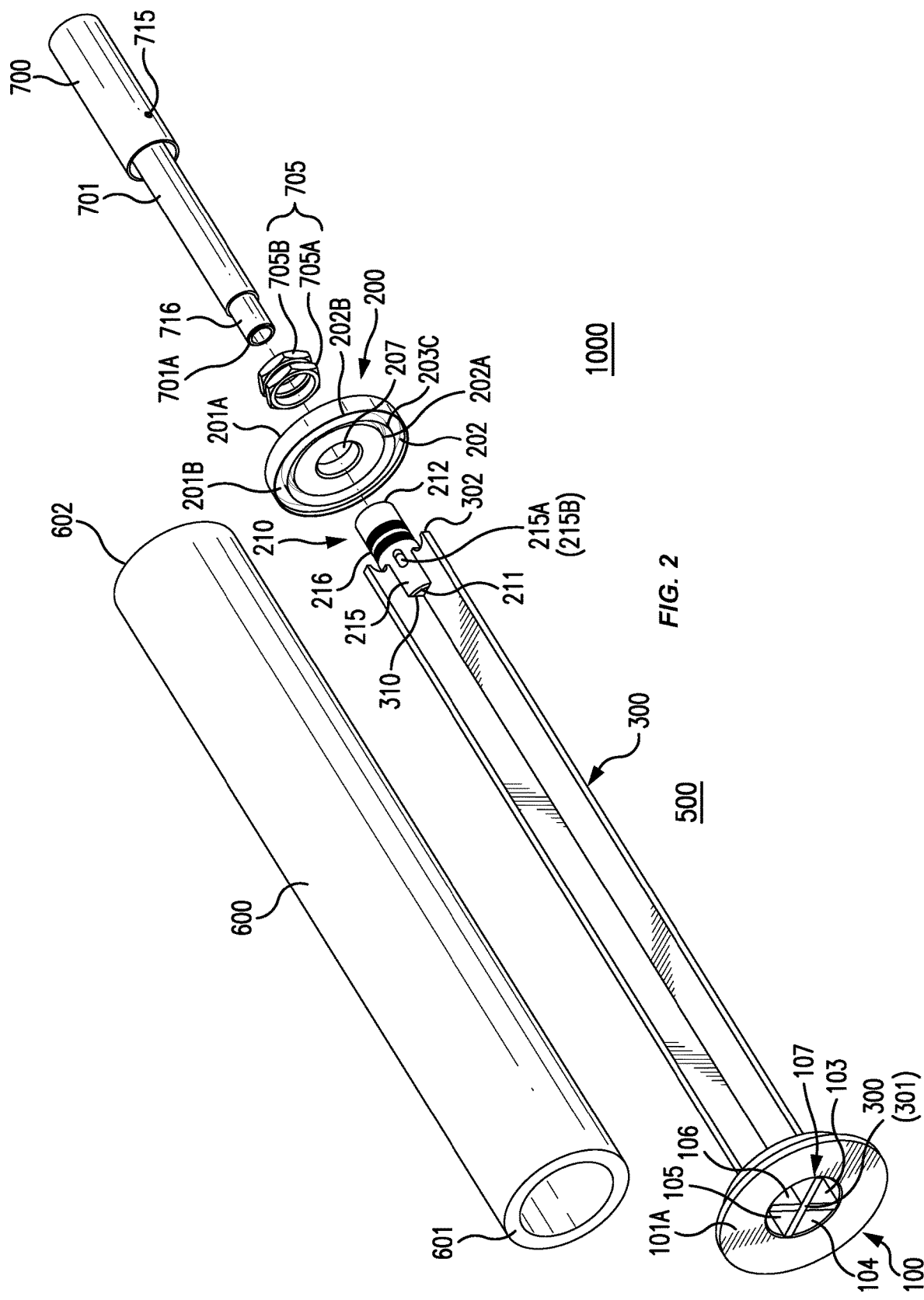
Figure 7A:
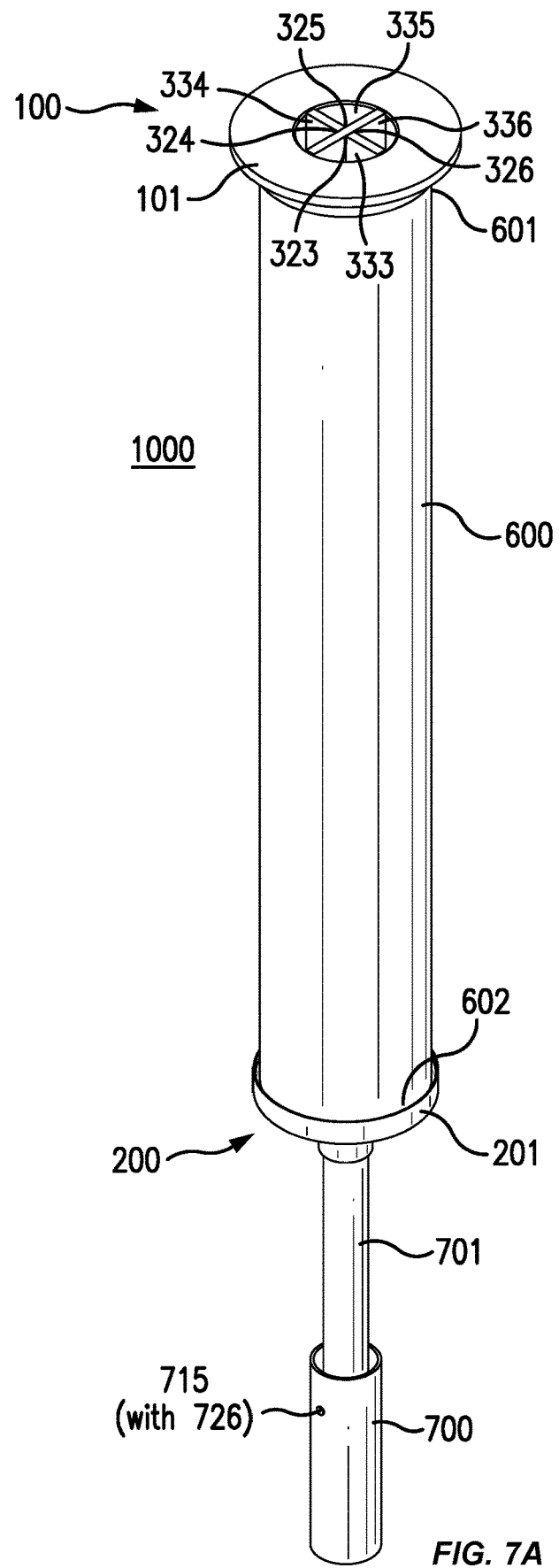

FIGS. 7A and 7B are drawings showing, respectively, perspective and cross-sectional views of the assembled filtration system shown in FIG. 2, wherein the system further comprises the fluid receiving container in fluid communication with the hollow fitting of the support for a coalescer filter element. FIG. 7C is a drawing showing a perspective view of a portion of the filtration system shown in FIG. 7A, without the hollow cylindrical coalescer filter element.

Figure 8:
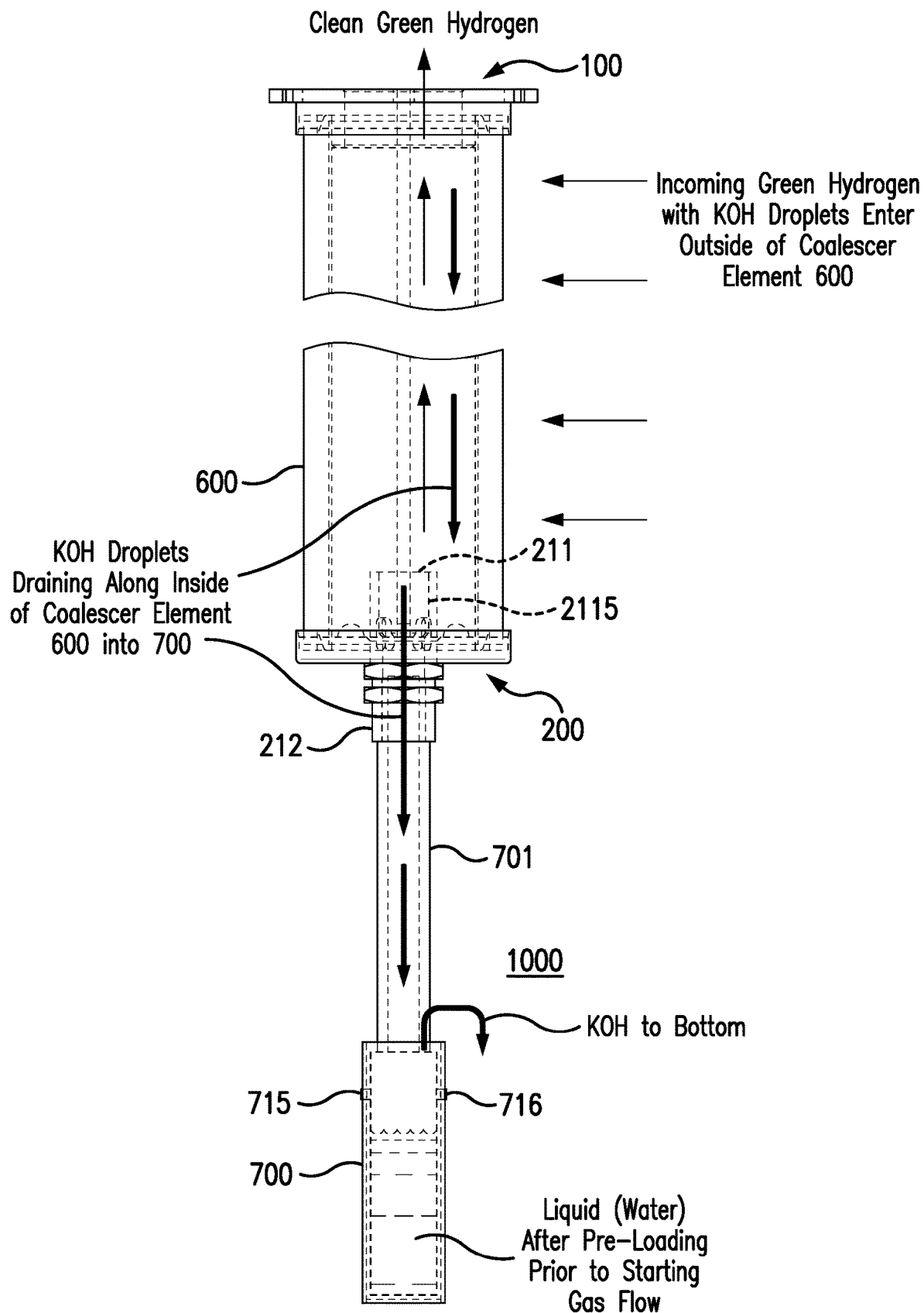

FIG. 8 is a drawing showing gas and liquid flow through the filtration system shown in FIGS. 7A and 7B.

Figure 9A:
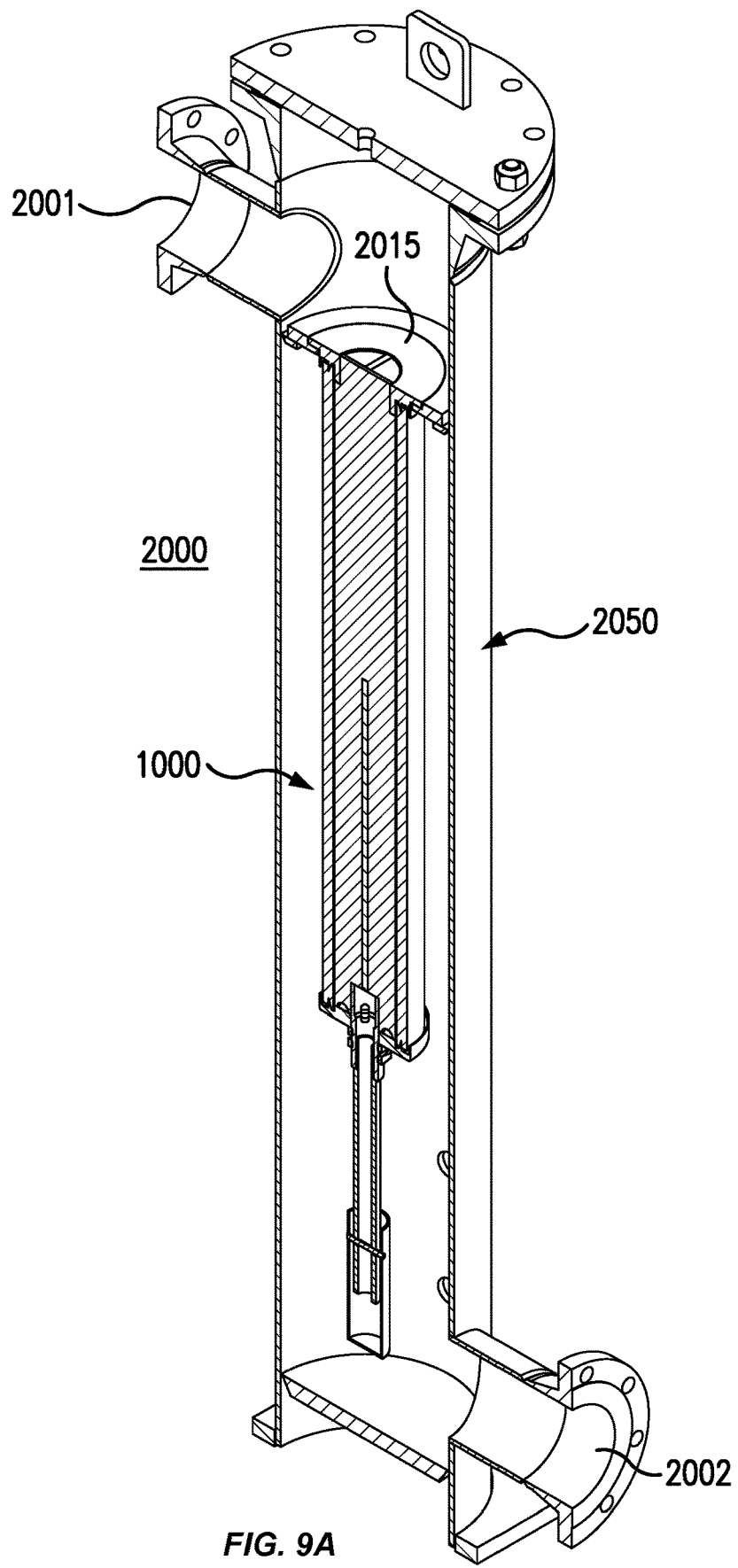
Figure 9B:
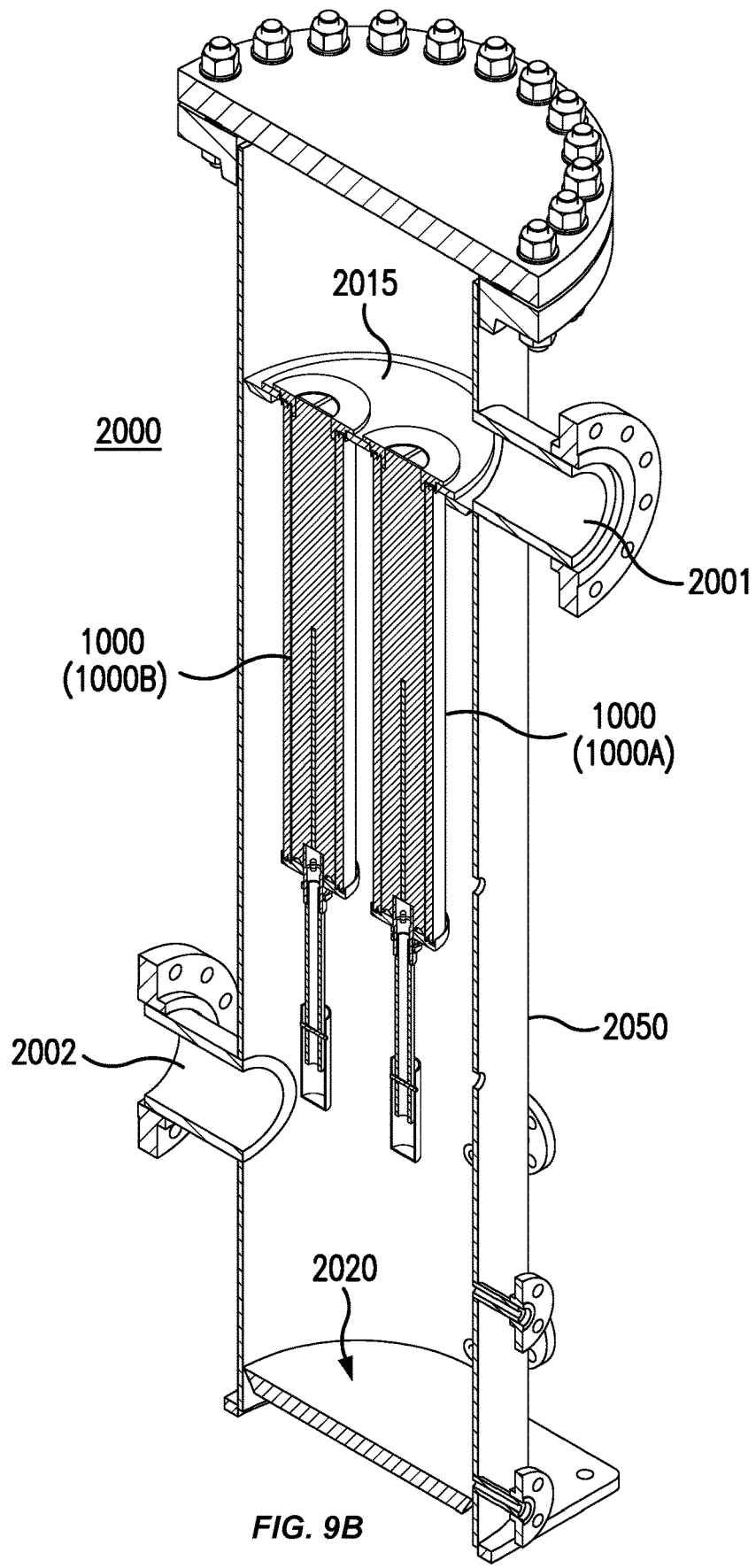

FIGS. 9A and 9B are drawings showing coalescer assemblies including one or more filtration systems shown in FIG. 7 according to an aspect of the invention, wherein FIG. 9A shows a coalescer assembly configured to receive a single filtration system, and FIG. 9B a coalescer assembly configured to receive a plurality of filtration systems.

Figure 10A:
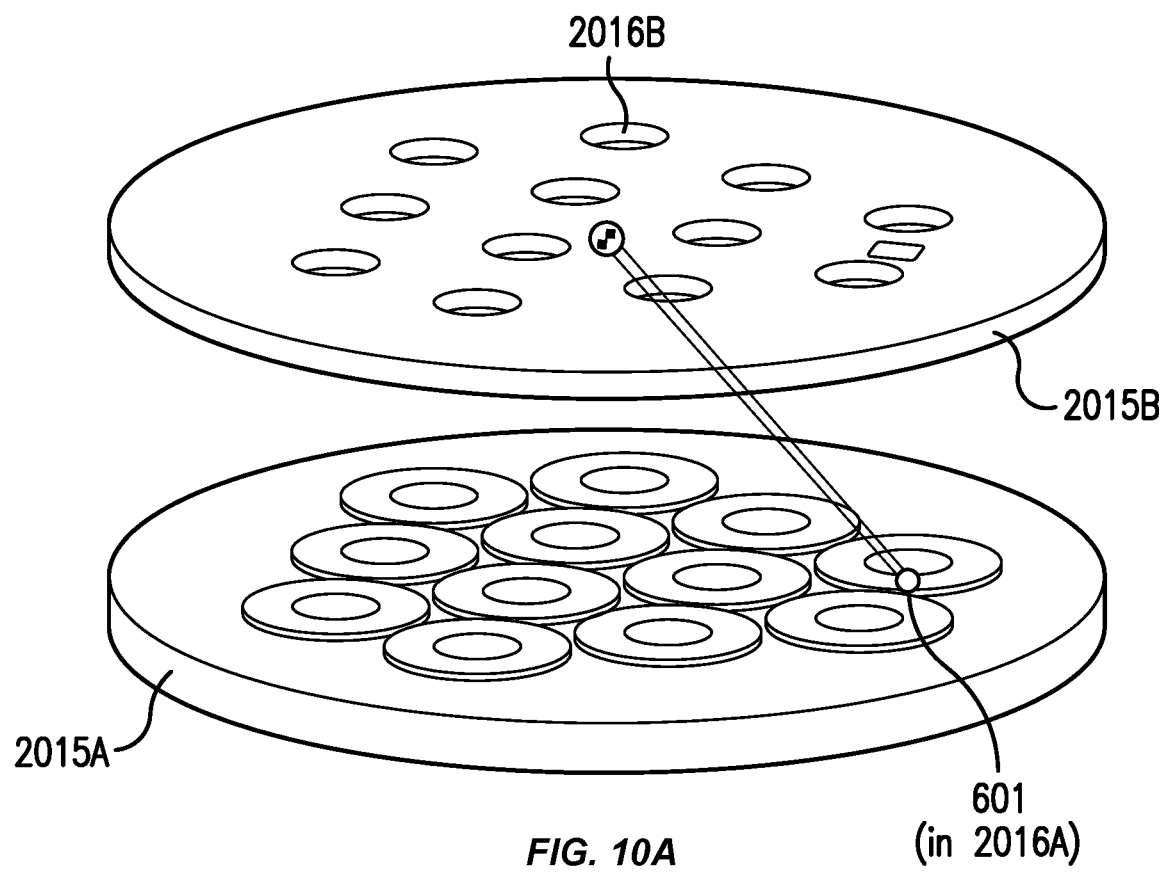
Figure 10B:
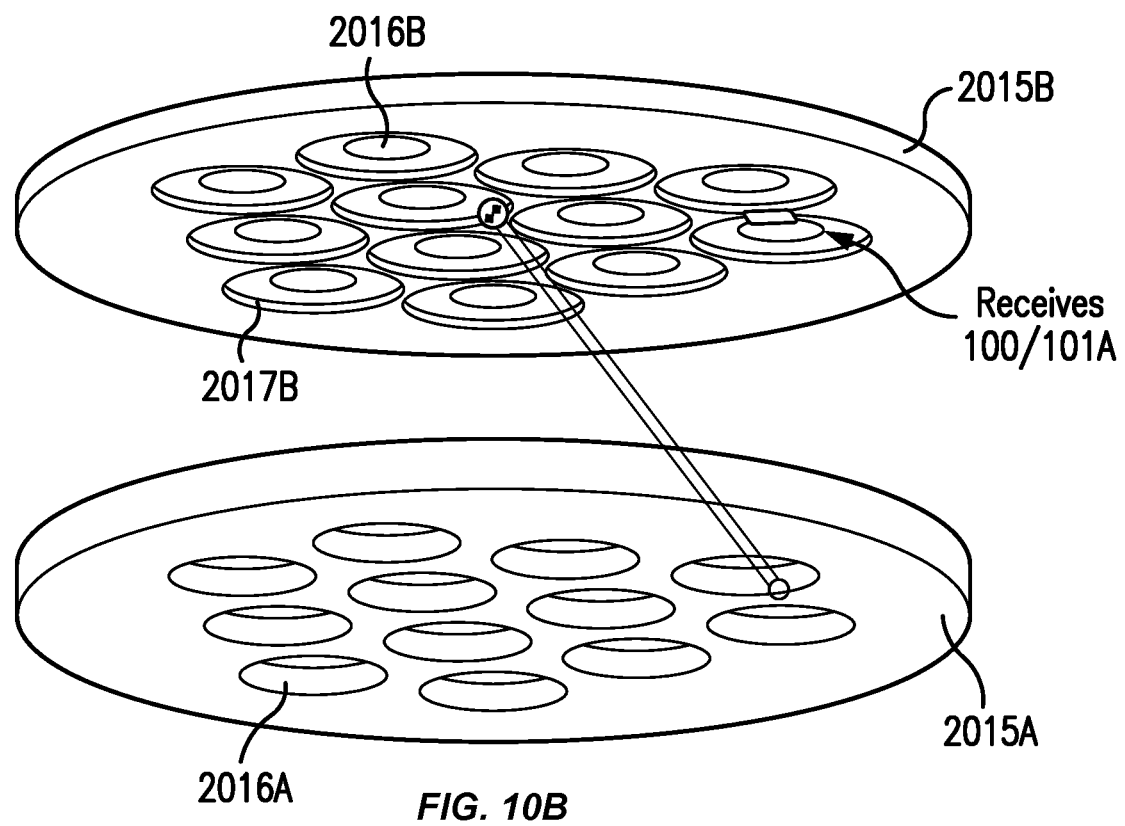

FIGS. 10A and 10B are drawings showing dual (first and second) filter plates for use in a coalescer assembly configured to receive a plurality of filtration systems according to another aspect of the invention.

DETAILED DESCRIPTION OF THE INVENTION

In accordance with an aspect of the invention, a support for a coalescer filter element is provided comprising: (a) a first end including a first end piece, the first end piece having an outer surface and an inner surface, and having a first end annular channel having first and second channel side walls, connected to the inner surface, and having at least three fluid channel openings passing through the outer surface and the inner surface: (b) a second end including a second end piece, the second end piece having an outer surface and an inner surface, and having a second end annular channel having first and second channel side walls, connected to the inner surface, the second end piece including a hollow fitting having an inlet end, an outlet end, and a side wall having at least two openings through the side wall, the outlet end extending outwardly from the outer surface: wherein the first end is connected to the second end by a fluid flow bar having at least three fluid channels extending from the first end to the second end, the fluid flow bar and the at least three fluid channels having a longitudinal axis from the first end to the second end, each of the at least three fluid channels having first and second solid side walls, each of the first and second solid side walls each having an inner side and an outer side, the inner side of the first solid wall connected to the inner side of the second solid wall, and the outer side of the first solid wall spaced away from the outer side of the second solid wall, wherein each of the at least three fluid channels separately communicate with a respective fluid channel opening at the first end; and wherein the hollow fitting and at least two openings are in fluid communication with the at least three fluid channels at the second end.

In some aspects of the support, the hollow fitting has a threaded external surface.

In another aspect, a filtration system is provided comprising: an aspect of the support for a coalescer filter element; and a hollow cylindrical coalescer filter element arranged on the support, such that the support passes through the hollow cylindrical coalescer filter element, and one end of the hollow cylindrical coalescer filter element is received in the first end annular channel and another end of the hollow cylindrical coalescer filter element is received in the second end annular channel.

In a preferred aspect, the filtration system further comprises a fluid receiving container arranged at the outlet end of the hollow fitting in fluid communication with the hollow fitting. In some aspects, a fluid receiving tube is interposed between the outlet end of the hollow fitting and the fluid receiving container, preferably, wherein the fluid receiving tube has a first tube end with a threaded external surface, and the filtration system includes at least one, preferably, two, threaded nuts for connecting the threaded hollow fitting to the threaded fluid receiving tube.

In another aspect, a method for removing undesirable contaminants and/or fluids from gas is provided, the method comprising passing gas through an aspect of the filtration system, and separating gas from undesirable contaminants and/or fluids. In a preferred aspect, the method comprises separating hydrogen and/or oxygen from KOH solution or water droplets.

In yet another aspect, a coalescer assembly is provided, comprising a housing having a housing inlet and a housing outlet and defining a fluid flow path from the housing inlet to the housing outlet with at least one filtration system in the housing across the fluid flow path.

In an aspect, a coalescer assembly comprises a housing having a housing outlet and a housing inlet defining a fluid flow path from the housing inlet to the housing outlet and including at least one filtration system in the housing comprising: a support for a coalescer filter element comprising:
(a) a first end including a first end piece, the first end piece having an outer surface and an inner surface, and having a first end annular channel having first and second channel side walls, connected to the inner surface, and having at least three fluid channel openings passing through the outer surface and the inner surface: (b) a second end including a second end piece, the second end piece having an outer surface and an inner surface, and having a second end annular channel having first and second channel side walls, connected to the inner surface, the second end piece including a hollow fitting having an inlet end, an outlet end, and a side wall having at least two openings through the side wall, the outlet end extending outwardly from the outer surface: wherein the first end is connected to the second end by a fluid flow bar having at least three fluid channels extending from the first end to the second end, the fluid flow bar and the at least three fluid channels having a longitudinal axis from the first end to the second end, each of the at least three fluid channels having first and second solid side walls, each of the first and second solid side walls each having an inner side and an outer side, the inner side of the first solid wall connected to the inner side of the second solid wall, and the outer side of the first solid wall spaced away from the outer side of the second solid wall, wherein each of the at least three fluid channels separately communicate with a respective fluid channel opening at the first end; and wherein the hollow fitting and at least two openings are in fluid communication with the at least three fluid channels at the second end: the at least one filtration system also including a hollow cylindrical coalescer filter element arranged on the support, such that the support passes through the hollow cylindrical coalescer filter element, and one end of the hollow cylindrical coalescer filter element is received in the first end annular channel and another end of the hollow cylindrical coalescer filter element is received in the second end annular channel; and a fluid receiving container arranged at the outlet end of the hollow fitting in fluid communication with the hollow fitting: wherein the at least one filtration system is across the fluid flow path.

In some aspects, the coalescer assembly includes two or more filtration systems in the housing across the fluid flow path.

Aspects of the coalescer assembly include a filter plate retaining an aspect of at least one filtration system in the housing, some aspects include first and second filter plates retaining an aspect of the at least one filtration system (some aspects retaining two or more filtration systems) in the housing.

Advantageously, aspects of the invention effectively remove undesirable contaminants and/or fluids, such as, e.g., KOH or NaOH, from electrolysis fluids at low differential pressure. Other advantages include the ability to use filter elements that are smaller than those typically used for these applications, providing smaller footprints, and the ability to be retrofitted or installed into existing systems requiring larger sized filter elements.

Each of the components of the invention will now be described in more detail below, wherein like components have like reference numbers.

Figure 1A:
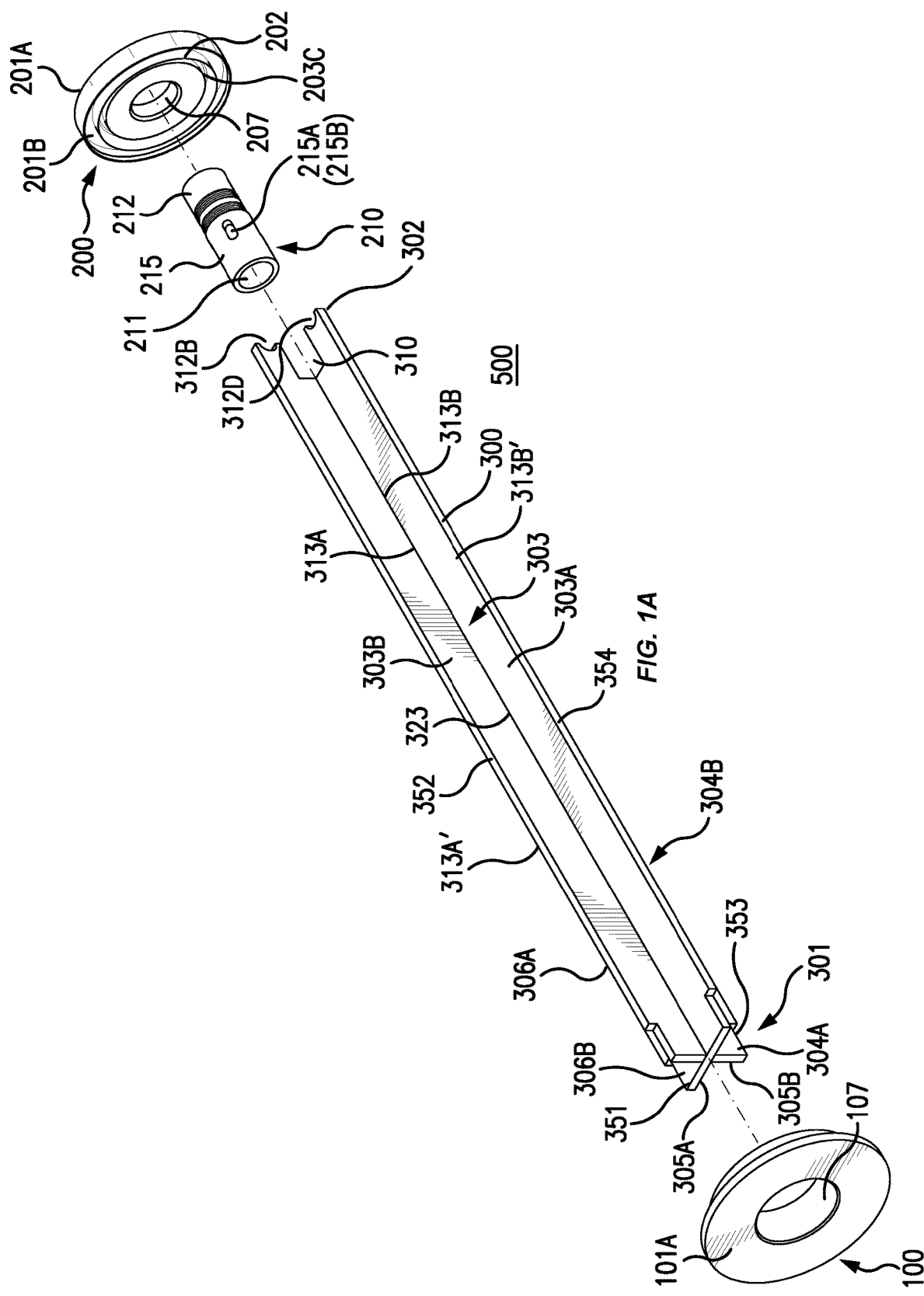
Figure 3:
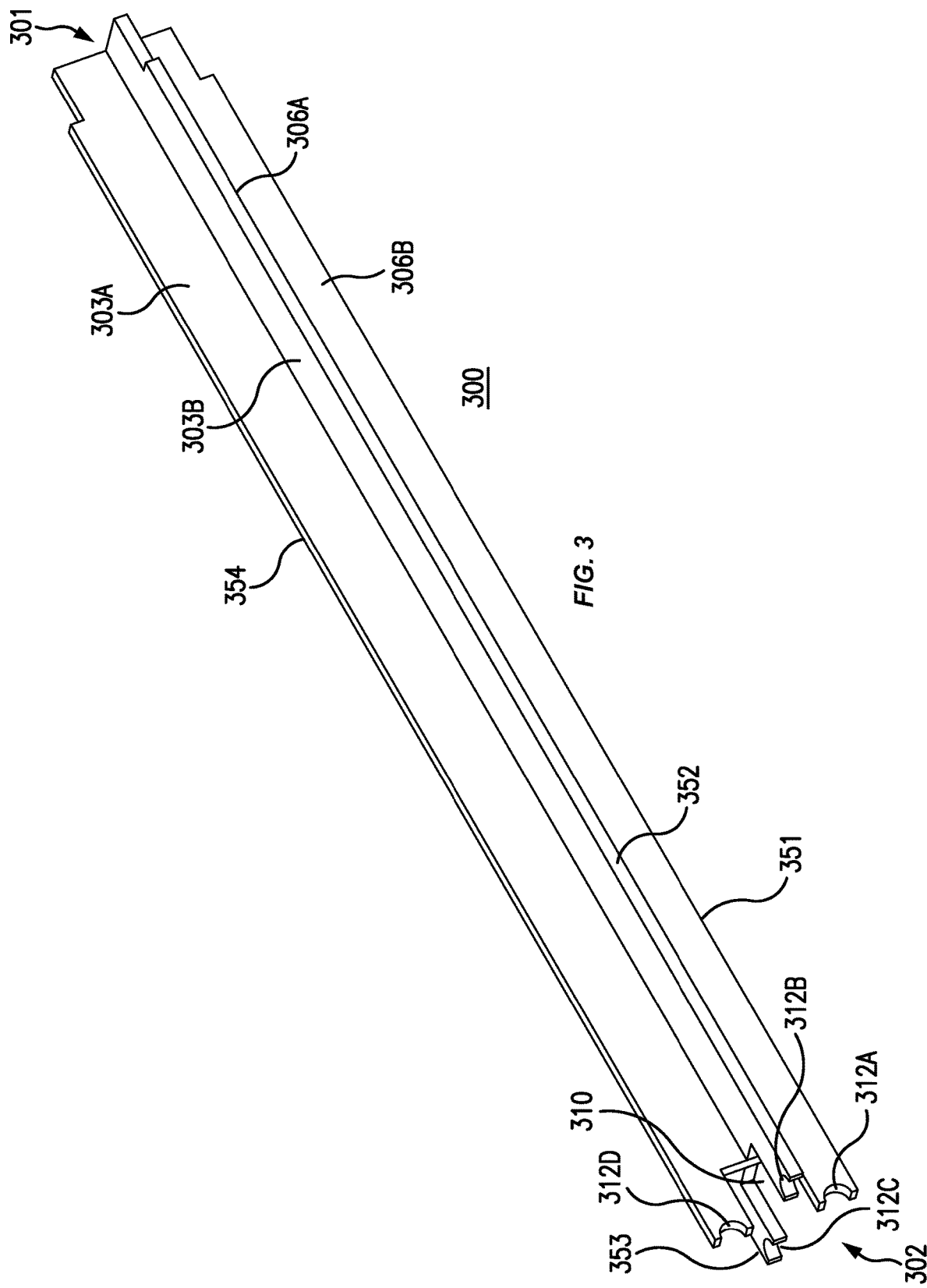
FIG. 3 is a drawing showing a perspective view of the fluid flow bar of the support shown in FIG. 1A.
Figure 4A:
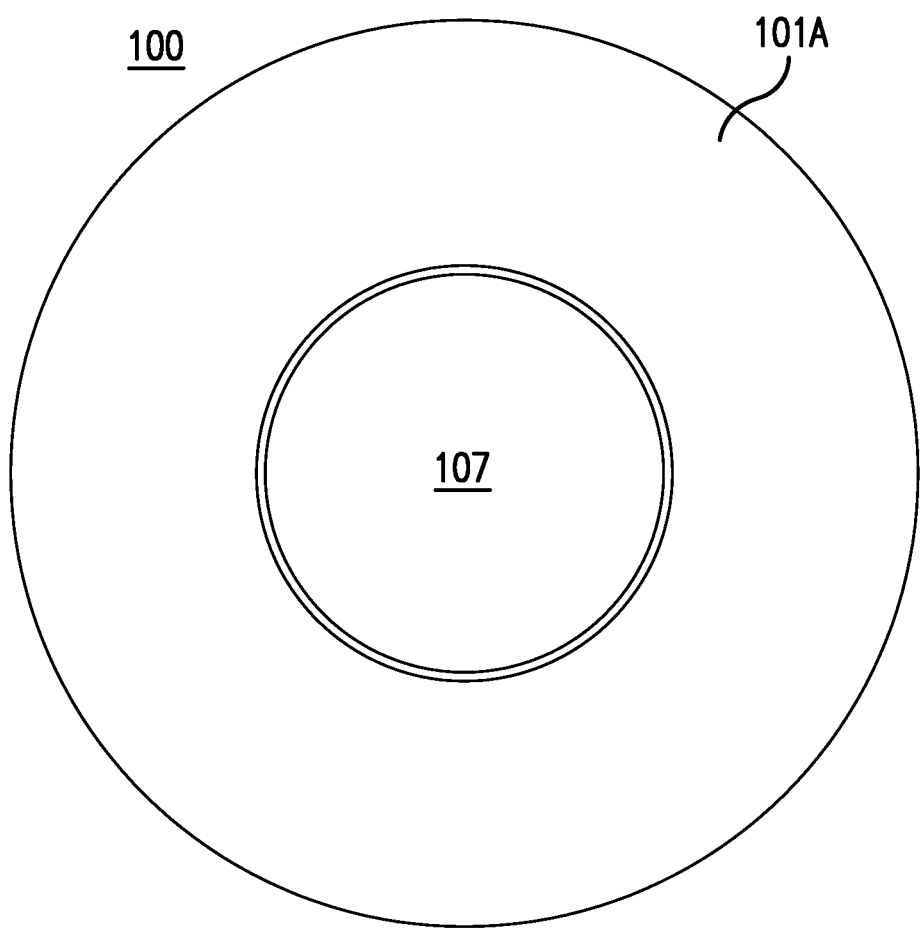
FIGS. 4A and 4B are drawings showing, respectively, top and bottom views of the first end piece of the support shown in FIG. 1A, also showing, respectively, the outer and inner surfaces of the first end piece.
Figure 4B:
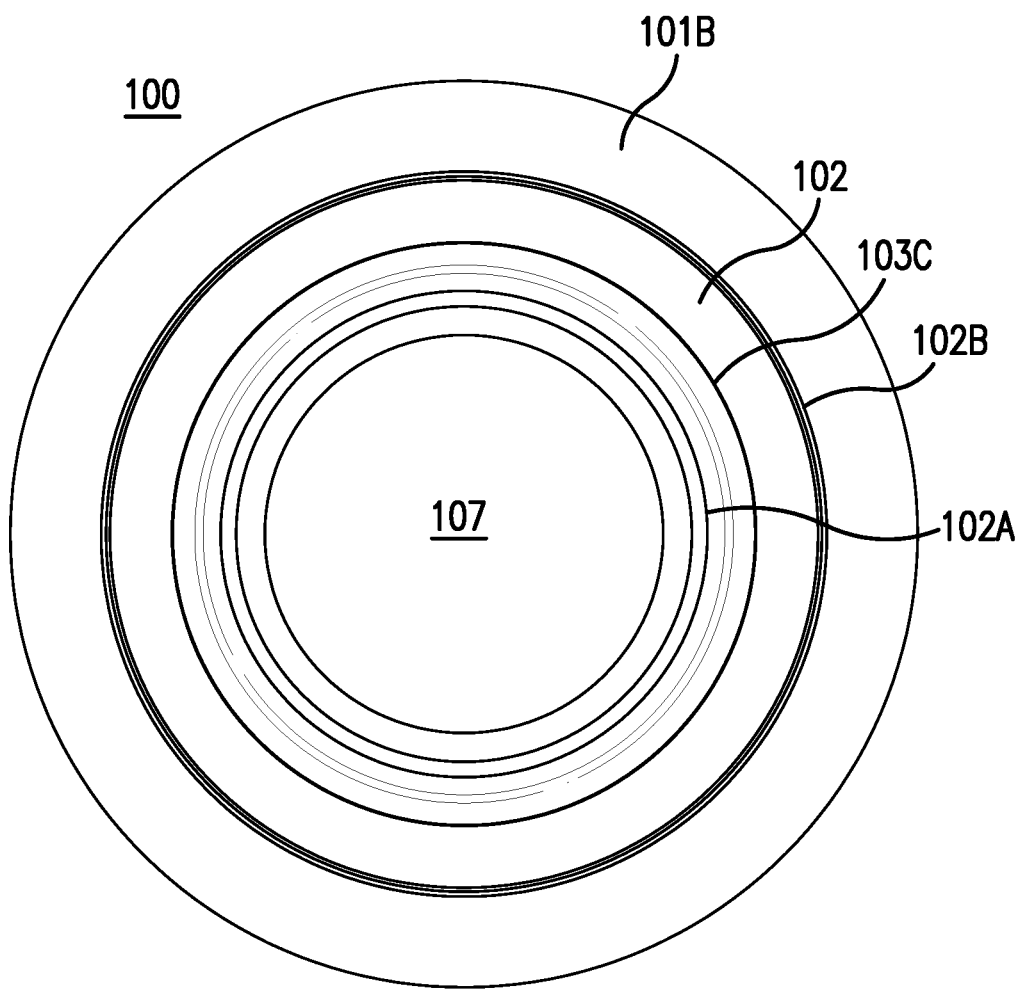
Figure 5A:
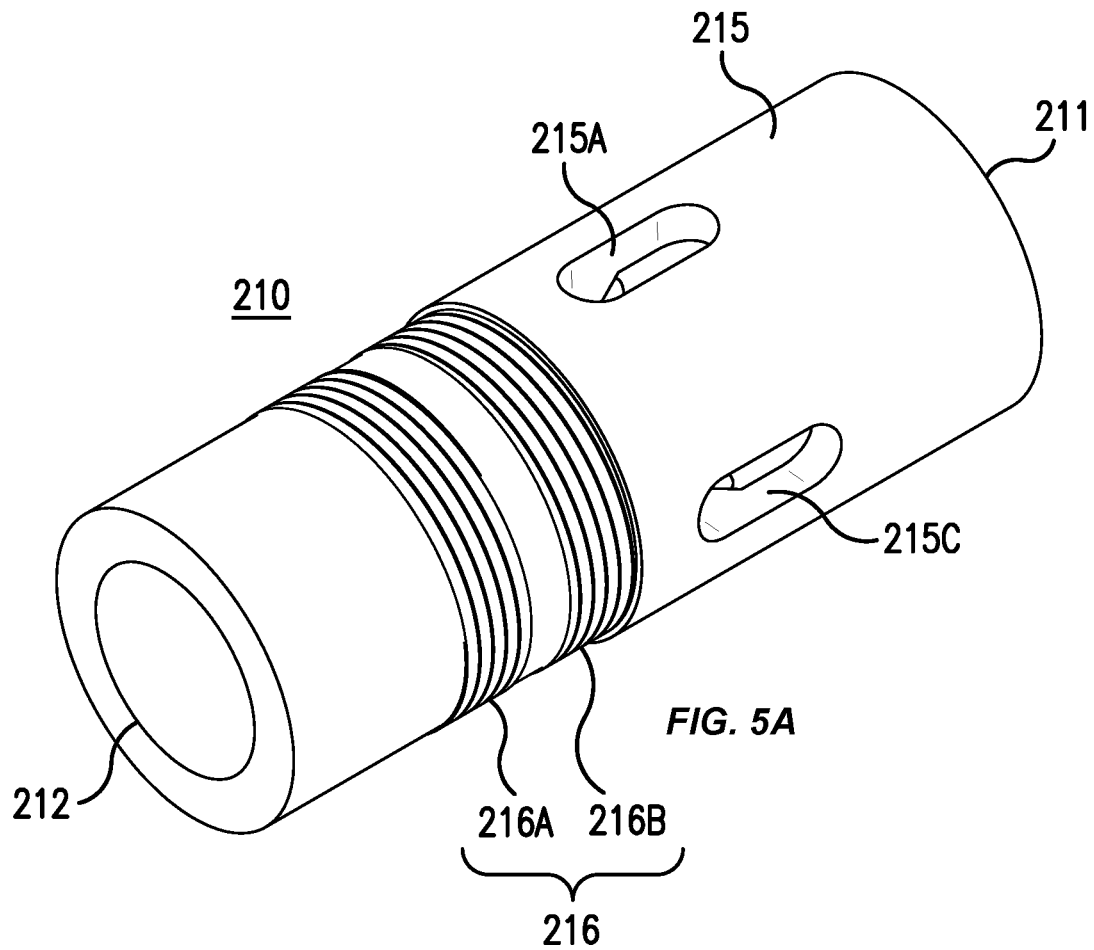
FIGS. 5A and 5B are drawings showing, respectively, perspective and cross-sectional views of the hollow fitting of the support shown in FIG. 1A FIGS. 6A and 6B are drawings showing, respectively, bottom and top views of the second end piece of the support shown in FIG. 1A, also showing, respectively, the inner and outer surfaces of the second end piece.
Figure 5B:
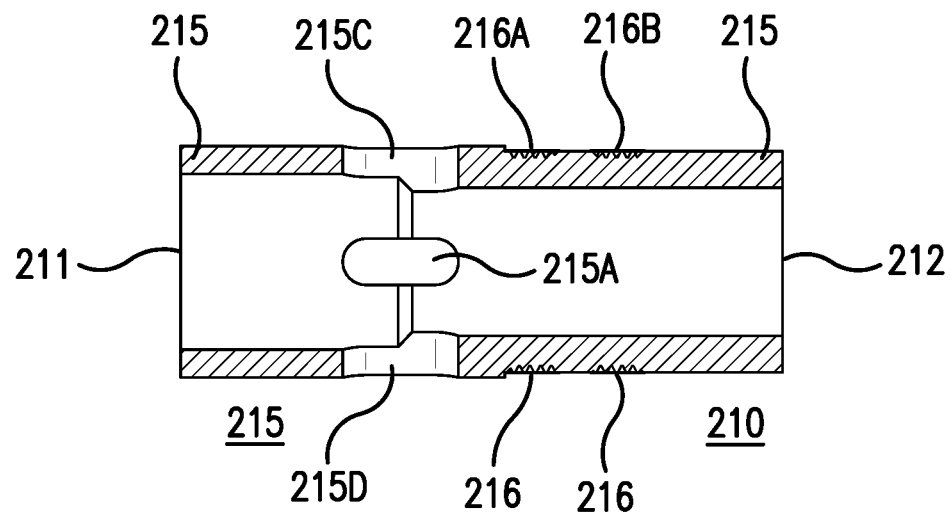
Figure 6A:
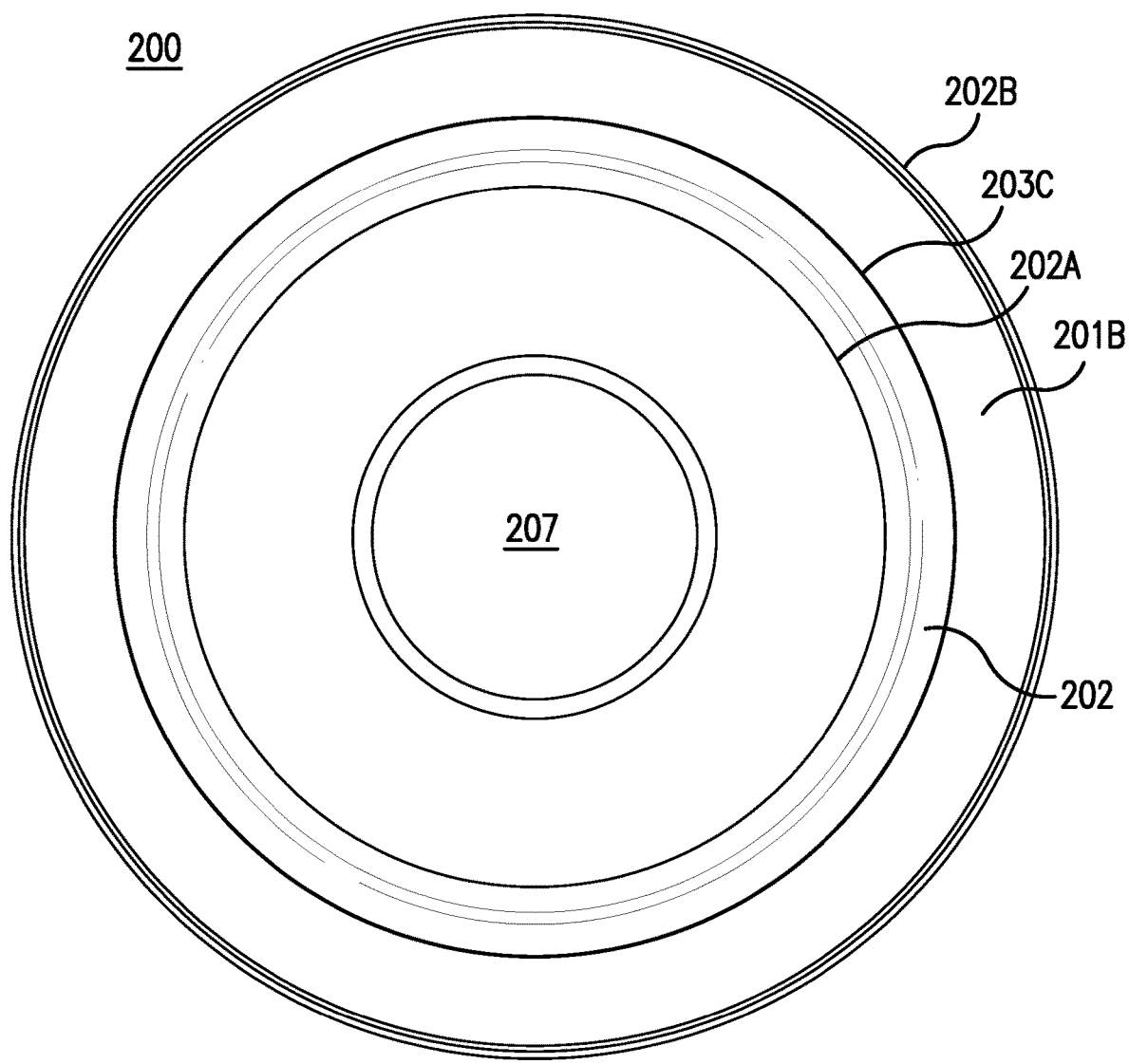
Figure 6B:
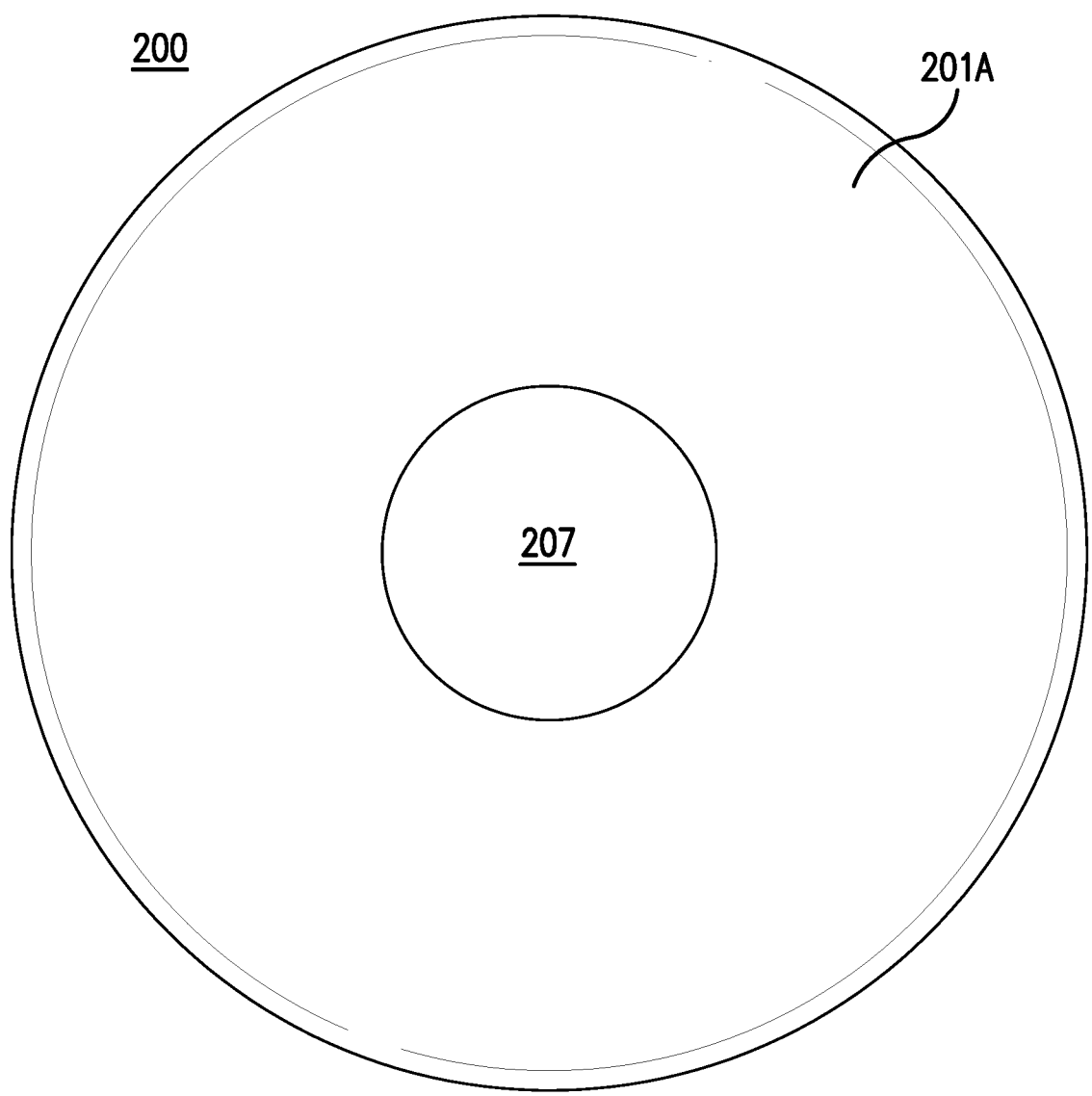

Using the exemplary aspects shown in FIGS. 1A-1B, 2, 7B, and 7C for reference, the illustrated support 500 for a coalescer filter element comprises:
(a) a first end 100 including a first end piece 101, the first end piece having an outer surface 101A and an inner surface 101B, and having a first end annular channel 102 having first and second channel side walls 102A, 102B, connected to the inner surface, and a central opening 107 passing through the outer surface and the inner surface: the central opening providing at least three fluid channel openings 103, 104, 105 (resulting from the insertion of fluid flow bar 300; see, FIGS. 1B, 2, 7A-7B) also showing a fourth fluid channel opening 106) passing through the outer surface and the inner surface;

(b) a second end 200 including a second end piece 201, the second end piece having an outer surface 201A and an inner surface 201B, a central opening 207 passing through the outer and inner surfaces, and having a second end annular channel 202 having first and second channel side walls 202A, 202B, connected to the inner surface, the second end piece including a hollow fitting 210) passing through the central opening 207, the hollow fitting having an inlet end 211, an outlet end 212, and a side wall 215 having at least two openings 215A, 215B through the side wall, the outlet end extending outwardly from the outer surface: wherein the first end is connected to the second end by a fluid flow bar 300 having a first end 301, a second end 302 (the second end including a central slot 310 and notches 312 (shown as 312A, 312B, 312C: see, FIG. 3, if present, notches can allow flow of liquid to continue to flow from the support if one or more of the hollow fitting openings are plugged), and at least three arms 351, 352, 353 providing at least three fluid channels 303, 304, 305 extending from the first ends 100, 301 to the second ends 200, 303 (the aspect of the fluid flow bar 300 shown in FIGS. 1A and 3 shows a fourth arm 354, a fourth fluid channel 306, and a fourth notch 312D), the fluid flow bar, the illustrated arms, and the illustrated fluid channels having a longitudinal axis from the first end 301 to the second end 302, each of the illustrated fluid channels having first and second solid side walls (303A, 303B; 304A, 304B; 305A, 305B; 306A, 306B), each of the first and second solid side walls each having an inner side and an outer side (313A, 313A'; 313B, 313B'; 314A, 314A'; 314B, 314B'; 315A, 315A'; 315B, 315B'; 316A, 316A'; 316B, 316B'), the inner side of the first solid wall connected to the inner side of the second solid wall (shown, connected (e.g., welded together) at 323 (313A connected to 313B), 324 (314A connected to 314B), 325 (315A connected to 315B), 326 (316A connected to 316B), and the outer side of the first solid wall spaced away from the outer side of the second solid wall (e.g., 313A' spaced away from 313B'; space shown as 333, 334, 335, 336; also showing channels forming generally "V-shaped" fluid channels), each of the illustrated four arms providing, on one face, a solid side wall for one fluid channel and, on the other face, a solid side wall for a different fluid channel (for example, using FIG. 3 for reference, arm 352 provides, one on face, solid wall 303B for fluid channel 303, and, on the other face, solid wall 306A for fluid channel 306), wherein each of the illustrated fluid channels separately communicate with a respective fluid channel opening at the first end (303 communicating with 103; 304 communicating with 104; 305 communicating with 105; and 306 communicating with 106); and wherein the hollow fitting 210 and the at least two openings (215A, 215B, third and fourth additional openings 215C and 215D are additionally shown in FIG. 5B) are in fluid communication with the illustrated fluid channels at the second end 200, the hollow fitting 210 being arranged in a slot 310 at the end 302 of the fluid flow bar 300 adjacent the second end 200.

The use of the at least two openings 215A, 215B (as well as at least one of 215C and 215D) is desirable to allow drainage of liquid from the hollow cylindrical coalescer filter element into the fluid receiving container 700.

Typically, a seal such as a knife-edge seal 103C, 203C is arranged in the annular channels 102, 202 for contacting and sealing against the ends of the hollow cylindrical coalescer filter element as shown in FIG. 7B.

In some aspects, as shown in FIG. 7B, an external side wall 108 of the first end piece 101 includes a groove 109 receiving a resilient annular member 115 such as an o-ring, which can reduce or prevent bypass between the first end 100 and a filter plate, for example, filter plate 2015 or first filter plate 2015A used in coalescer assemblies (see, for example, FIGS. 9A-9B).

In these illustrated aspects, the hollow fitting 210 has a threaded external surface 216, wherein the illustrated aspect has two sets of threads (see, FIGS. 5A and 5B).

Typically, the first end piece 101 (shown having a flange) can be sandwiched between filter plates, or, optionally, can include two or more slots for retainers such as screws or pins (not shown), e.g., for connection to a coalescer assembly housing (see, for example, FIGS. 1A-1B, 9A-9B, and 10A-10B).

Figure 1B:
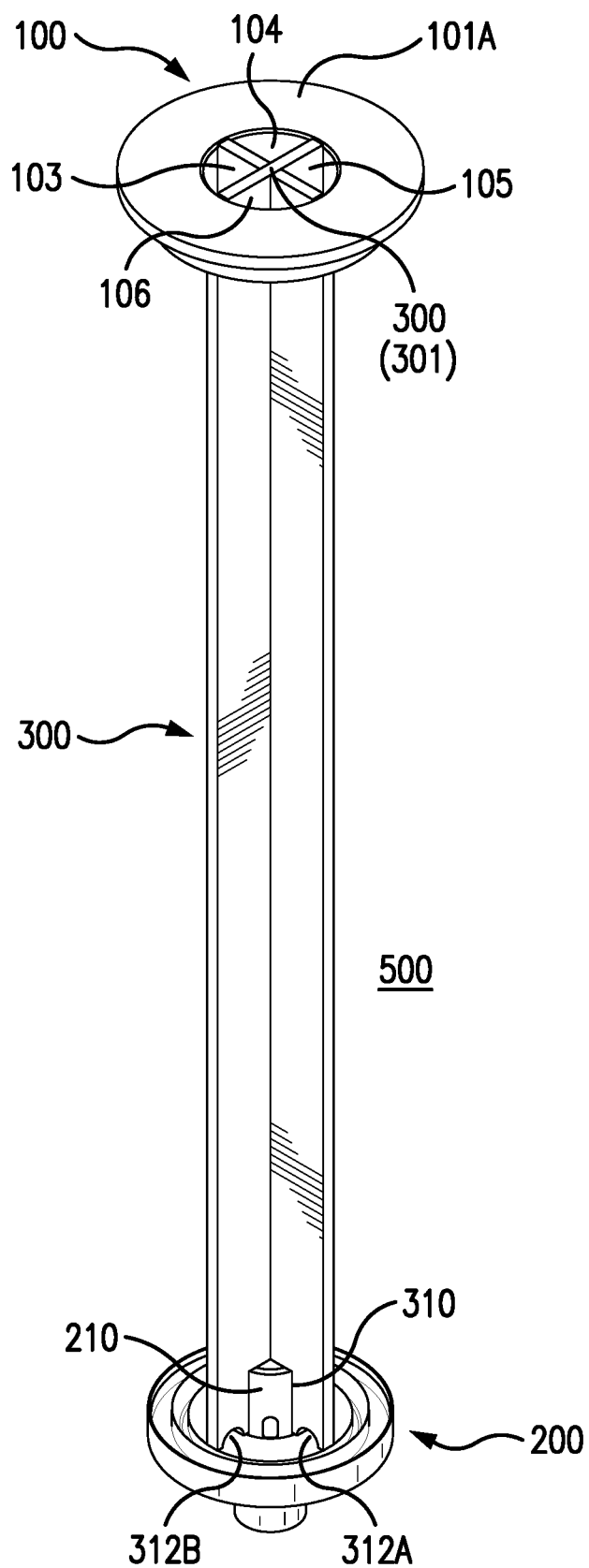

Using the exemplary aspects shown in FIGS. 2, 7A-7B, and 8 for reference, the illustrated filtration system 1000 includes the aspect of the support 500 for a coalescer filter element as discussed with respect to FIGS. 1A-1B, and 7C, and a hollow cylindrical coalescer filter element 600 arranged on the support, such that the support passes through the hollow cylindrical coalescer filter element, and one end 601 of the hollow cylindrical coalescer filter element is received in the first end annular channel 102 and another end 602 of the hollow cylindrical coalescer filter element is received in the second end annular channel 202.

In a preferred aspect, the filtration system further comprises a fluid receiving container 700 (shown as a pipe with a closed end) arranged at the outlet end of the hollow fitting in fluid communication with the hollow fitting. If desired, the fluid receiving container can function as a "liquid lock." In some aspects, a fluid receiving tube 701 is interposed between the outlet end 212 of the hollow fitting and the fluid receiving container 700, preferably, wherein the fluid receiving tube has a first tube end 701 with a threaded external surface 716, and the filtration system includes at least one 705, preferably, two, threaded nuts 705A, 705B for connecting the threaded hollow fitting to the threaded fluid receiving tube. In some aspects, the fluid receiving tube is attached to the fluid receiving container by a retainer such as a pin or screw 726 passing through a throughhole 715.

In some aspects, the fluid receiving container functions as a "liquid lock" as follows: The liquid receiving container is primed/pre-loaded with liquid (e.g., water, see, FIG. 8) before start up to prevent gasses from entering the bottom of the liquid lock and traveling up the inner tube and bypassing the coalescer filter element 600.

After pre-loading, the system is subsequently operated to pass gas containing liquid through the system. Liquids draining off of the filter coalescer element 600 collect in the second end piece 201. The liquids then drain through the openings (215A, 215B, 215C, 215D) and drain down the first tube 701 and collect in the fluid receiving container 700. As the water collects in the liquid lock (already containing pre-loaded liquid) water overflows out the top as shown in FIG. 8. This liquid drains down into the bottom of the housing (see, for example, sump 2020 for receiving the overflow in FIG. 9B)

Using the aspect shown in FIG. 8 for reference, a method for removing undesirable contaminants and/or fluids from gas (shown as "green" hydrogen (obtained by electrolysis of water)) comprises passing gas containing liquid (shown as KOH droplets) through an aspect of the filtration system, and separating clean gas (shown as green hydrogen) passing upwardly through the fluid channel openings of the first end) from undesirable contaminants and/or fluids (shown as KOH droplets coalescing and draining downwardly along the fluid channels of fluid flow bar, through the hollow fitting and fluid receiving tube into the fluid receiving container.

In yet another aspect, a coalescer assembly is provided, comprising a housing having a housing inlet and a housing outlet and defining a fluid flow path from the housing inlet to the housing outlet with at least one filtration system in the housing across the fluid flow path.

FIGS. 9A and 9B are drawings showing coalescer assemblies 2000 comprising housings 2050 having an outlet 2001 and an inlet 2002 defining a fluid flow path from the inlet to the outlet and including one or more filtration systems 1000 shown in FIG. 7A according to an aspect of the invention across the fluid flow path, wherein FIG. 9A shows a coalescer assembly 2000 configured to receive a single filtration system 1000, and FIG. 9B a coalescer assembly configured to receive a plurality of filtration systems 1000 (shown as 1000A and 1000B). In these illustrated embodiments, the assemblies each include a filter plate 2015 retaining the systems in the housings.

Using FIGS. 9B, 10A and 10B for reference, in some aspects of coalescer assemblies configured to receive a plurality of filtration systems, first and second filter plates 2015A and 2015B can be used to retain the filtration systems 1000A, 1000B (and additional filtration systems) in the housing 2050, e.g., by "sandwiching" the first end 100 between the first and second plates. Illustratively, in the aspects shown in FIGS. 10A and 10B, first end plate 2015A is shown with through holes 2016A, for receiving the end 601 of the hollow cylindrical coalescer filter element 600, and second end plate 2015B is shown with through holes 2016B, and having an inner surface with recesses 2017B for receiving the first end pieces 101, wherein the plates 2015A and 2015B are configured to secure the first ends 100 in the housing 2050.

A variety of filter elements functioning as coalescers, and filters including those filter elements can be used in accordance with aspects of the invention. Suitable filter elements include, for example, those configured as a hollow cylindrical depth filter elements without cores.

The filter and/or filter element can include additional elements, layers, or components, that can have different structures and/or functions, e.g., at least one of any one or more of the following: prefiltration, support, drainage, spacing and cushioning. Illustratively, the filter can also include at least one additional element such as a mesh and/or a screen.

The coalescer assembly housing can be fabricated from any suitable rigid impervious material, including any impervious thermoplastic material, which is compatible with the fluid being processed. For example, the housing can be fabricated from a metal, such as stainless steel, or from a polymer.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred aspects of this invention are described herein, including the best mode known to the inventors for carrying out the invention. Variations of those preferred aspects may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A support for a coalescer filter element comprising:
   (a) a first end including a first end piece, the first end piece having an outer surface and an inner surface, and having a first end annular channel having first and second channel side walls, connected to the inner surface, and having at least three fluid channel openings passing through the outer surface and the inner surface;
   (b) a second end including a second end piece, the second end piece having an outer surface and an inner surface, and having a second end annular channel having first and second channel side walls, connected to the inner surface, the second end piece including a hollow fitting having an inlet end, an outlet end, and a side wall having at least two openings through the side wall, the outlet end extending outwardly from the outer surface;
   wherein the first end is connected to the second end by a fluid flow bar having at least three fluid channels extending from the first end to the second end, the fluid flow bar and the at least three fluid channels having a longitudinal axis from the first end to the second end, each of the at least three fluid channels having first and second solid side walls, each of the first and second solid side walls each having an inner side and an outer side, the inner side of the first solid wall connected to the inner side of the second solid wall, and the outer side of the first solid wall spaced away from the outer side of the second solid wall, wherein each of the at least three fluid channels separately communicate with a respective fluid channel opening at the first end; and wherein the hollow fitting and at least two openings are in fluid communication with the at least three fluid channels at the second end.

2. The support of claim 1, wherein the hollow fitting has a threaded external surface.

3. A filtration system comprising:
the support for a coalescer filter element of claim 1, and a hollow cylindrical coalescer filter element arranged on the support, such that the support passes through the hollow cylindrical coalescer filter element, and one end of the hollow cylindrical coalescer filter element is received in the first end annular channel and another end of the hollow cylindrical coalescer filter element is received in the second end annular channel.

4. The filtration system of claim 3, further comprising a fluid receiving container arranged at the outlet end of the hollow fitting in fluid communication with the hollow fitting.

5. A method for removing undesirable contaminants and/or fluids from gas, the method comprising passing gas through the filtration system of claim 3, and separating gas from undesirable contaminants and/or fluids.

6. The method of claim 5, comprising separating hydrogen from KOH droplets.

7. A coalescer assembly comprising a housing having a housing outlet and a housing inlet defining a fluid flow path from the housing inlet to the housing outlet and including at least one filtration system in the housing comprising:
a support for a coalescer filter element comprising:
(a) a first end including a first end piece, the first end piece having an outer surface and an inner surface, and having a first end annular channel having first and second channel side walls, connected to the inner surface, and having at least three fluid channel openings passing through the outer surface and the inner surface;
(b) a second end including a second end piece, the second end piece having an outer surface and an inner surface, and having a second end annular channel having first and second channel side walls, connected to the inner surface, the second end piece including a hollow fitting having an inlet end, an outlet end, and a side wall having at least two openings through the side wall, the outlet end extending outwardly from the outer surface;

wherein the first end is connected to the second end by a fluid flow bar having at least three fluid channels extending from the first end to the second end, the fluid flow bar and the at least three fluid channels having a longitudinal axis from the first end to the second end, each of the at least three fluid channels having first and second solid side walls, each of the first and second solid side walls each having an inner side and an outer side, the inner side of the first solid wall connected to the inner side of the second solid wall, and the outer side of the first solid wall spaced away from the outer side of the second solid wall, wherein each of the at least three fluid channels separately communicate with a respective fluid channel opening at the first end; and wherein the hollow fitting and at least two openings are in fluid communication with the at least three fluid channels at the second end;

the at least one filtration system also including a hollow cylindrical coalescer filter element arranged on the support, such that the support passes through the hollow cylindrical coalescer filter element, and one end of the hollow cylindrical coalescer filter element is received in the first end annular channel and another end of the hollow cylindrical coalescer filter element is received in the second end annular channel; and a fluid receiving container arranged at the outlet end of the hollow fitting in fluid communication with the hollow fitting;

wherein the at least one filtration system is across the fluid flow path.

8. The coalescer assembly according to claim 7, including a first filter plate and a second filter plate retaining the at least one filtration system in the housing.

9. The coalescer assembly according to claim 8, wherein the first filter plate and the second filter plate retain at least two filtration systems in the housing.

10. A filtration system comprising:
the support for a coalescer filter element of claim 2, and a hollow cylindrical coalescer filter element arranged on the support, such that the support passes through the hollow cylindrical coalescer filter element, and one end of the hollow cylindrical coalescer filter element is received in the first end annular channel and another end of the hollow cylindrical coalescer filter element is received in the second end annular channel.

11. A method for removing undesirable contaminants and/or fluids from gas, the method comprising passing gas the filtration system of claim 4, and separating gas from undesirable contaminants and/or fluids.

* * * * *